United States Patent
Li et al.

(10) Patent No.: US 10,103,979 B2
(45) Date of Patent: Oct. 16, 2018

(54) CONTROL DEVICE, SYSTEM, AND TRANSMISSION CHANNEL ADJUSTMENT METHOD IN SOFTWARE-DEFINED NETWORKING

(71) Applicant: Huawei Technologies Co., Ltd., Shenzhen (CN)

(72) Inventors: Jianfei Li, Beijing (CN); Jiao Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/382,041

(22) Filed: Dec. 16, 2016

(65) Prior Publication Data

US 2017/0099217 A1    Apr. 6, 2017

Related U.S. Application Data

(63) Continuation of application No. PCT/CN2014/080024, filed on Jun. 17, 2014.

(51) Int. Cl.
*H04L 12/771* (2013.01)
*H04L 12/803* (2013.01)
(Continued)

(52) U.S. Cl.
CPC ............ *H04L 45/56* (2013.01); *H04L 45/125* (2013.01); *H04L 45/22* (2013.01); *H04L 47/122* (2013.01); *H04L 47/125* (2013.01); *H04L 47/29* (2013.01)

(58) Field of Classification Search
CPC ........ H04L 45/56; H04L 47/29; H04L 47/122
See application file for complete search history.

(56) References Cited

U.S. PATENT DOCUMENTS 8,243,592 B2 * 8/2012 Taylor ................. H04L 12/2854
                                                    370/225
8,428,611 B2 * 4/2013 De Pasquale ........... H04L 45/00
                                                    455/452.2
(Continued)

FOREIGN PATENT DOCUMENTS

CN         1964544 A      5/2007
CN       103428103 A     12/2013
(Continued)

OTHER PUBLICATIONS

Machine Translation and Abstract of Chinese Publication No. CN1964544, May 16, 2007, 12 pages.

(Continued)

*Primary Examiner* — Rasheed Gidado
(74) *Attorney, Agent, or Firm* — Conley Rose, P.C.

(57) ABSTRACT

A control device, a system, and a transmission channel adjustment method in software-defined networking (SDN) where, a connection status of a control channel is acquired, it is determined, according to a preset threshold, whether a standby channel is suitable to continue serving as a standby channel. The standby channel is adjusted when the standby channel is congested to a specific extent and another uncongested channel is set as the standby channel, and the standby channel is switched to an active channel when the active channel is congested such that real-time channel adjustment is ensured, effective transmission of control information is ensured, and control reliability of a control device in SDN is improved.

15 Claims, 8 Drawing Sheets

(51) Int. Cl.
 *H04L 12/801* (2013.01)
 *H04L 12/729* (2013.01)
 *H04L 12/707* (2013.01)

(56) References Cited

U.S. PATENT DOCUMENTS

| | | | | |
|---|---|---|---|---|
| 8,788,781 | B2* | 7/2014 | Lee | G06F 3/0613 711/114 |
| 8,976,850 | B2* | 3/2015 | Clerckx | H04B 7/0626 375/213 |
| 9,038,151 | B1* | 5/2015 | Chua | H04L 45/02 709/223 |
| 2009/0238074 | A1 | 9/2009 | Vasseur et al. | |
| 2013/0336159 | A1 | 12/2013 | Previdi et al. | |
| 2015/0312658 | A1* | 10/2015 | Winzer | H04Q 11/0005 398/5 |

FOREIGN PATENT DOCUMENTS

| | | |
|---|---|---|
| CN | 103782552 A | 5/2014 |
| WO | 2012129810 A1 | 10/2012 |

OTHER PUBLICATIONS

Machine Translation and Abstract of Chinese Publication No. CN103428103, Dec. 4, 2013, 13 pages.
Foreign Communication From a Counterpart Application, European Application No. 14895367.2, Extended European Search Report dated Jun. 16, 2017, 5 pages.
Foreign Communication From a Counterpart Application, PCT Application No. PCT/CN2014/080024, English Translation of International Search Report dated Mar. 24, 2015, 2 pages.
Foreign Communication From a Counterpart Application, PCT Application No. PCT/CN2014/080024, English Translation of Written Opinion dated Mar. 24, 2015, 5 pages.
Foreign Communication From a Counterpart Application, Chinese Application No. 201480056019.6, Chinese Search Report dated Jun. 25, 2018, 2 pages.
Foreign Communication From a Counterpart Application, Chinese Application No. 201480056019.6, Chinese Office Action dated Jul. 4, 2018, 3 pages.

\* cited by examiner

CONTROL DEVICE, SYSTEM, AND TRANSMISSION CHANNEL ADJUSTMENT METHOD IN SOFTWARE-DEFINED NETWORKING

CROSS-REFERENCE TO RELATED APPLICATION

This application is a continuation of International Application No. PCT/CN2014/080024, filed on Jun. 17, 2014, which is hereby incorporated by reference in its entirety.

TECHNICAL FIELD

The present disclosure relates to the field of information technologies, and in particular, to a control device, a system, and a transmission channel adjustment method in software-defined networking (SDN).

BACKGROUND

In SDN, two functional modules of a traditional network device that are configured for data forwarding and management control are separated, and a centralized control device is used to configure, manage, and control various network devices using a standardized interface. A switching device switch strictly performs forwarding based on a flow table, the switch provides an interface for the control device for control, and a specific protocol is followed between the switch and the controller.

In the SDN, features of the switch include the following. 1. The flow table is initially empty. 2. When a routing table that match a received data packet is not found in the switch, reporting to the Controller is performed to request a forwarding policy. A feature of the controller includes possessing a global view of the entire network, and formulating a delivery policy for a request reported by the switch.

There are generally two networking modes for the SDN network, out-of-band connection control (out-of-band mode) and in-band connection control (in-band mode).

(1) Out-of-band connection mode: The control device is directly connected to each switching device, and there is an independent control channel in the network. Control information and data information are transmitted without affecting each other, and control signaling has relatively high security. However, in this mode, each switch in the network needs to have a designated port for forwarding control signaling, which consumes more port resources.

(2) In-band connection mode: The control device needs to be connected to only some switching devices, and implements communication with another switching device using a data plane link. In this mode, transmission of control information and transmission of data information are mutually affected, and security is relatively low.

In the in-band connection mode, the control information and the data information share a same transmission channel, and therefore, forwarding of the data information may cause congestion of the transmission channel, and affect effective transmission of the control information. The control device loses a capability of controlling multiple switching devices if the channel for transmitting the control information fails due to congestion.

SUMMARY

Embodiments of the present disclosure provide a control device, a system, and a transmission channel adjustment method in SDN, to resolve a problem of low reliability in an in-band mode caused by congestion of a transmission channel and untimely adjustment of a control channel.

An embodiment of the present disclosure provides a control device in the SDN, where control information and data information in the SDN are transmitted on a same transmission channel, the control device controls a first transmission channel, a second transmission channel, and a third transmission channel, the first transmission channel is an active channel, the second transmission channel is a standby channel of the first transmission channel and is switched as an active channel when the first transmission channel is congested, to transmit the control information and/or the data information, and the control device is configured to perform at least one of acquire connection statuses of the first transmission channel, the second transmission channel, and the third transmission channel, set the third transmission channel as a standby channel of the first transmission channel when the connection status of the second transmission channel reaches a first state, where the first state means that a congestion degree of a transmission channel reaches a first threshold but does not reach a second threshold, a transmission channel whose congestion degree reaches the first threshold is congested but can transmit the control information, a transmission channel that reaches the second threshold is congested and cannot transmit the control information, and the third transmission channel is a channel whose transmission channel does not reach the first state and that can replace the first transmission channel to transmit the control information and/or the data information, and switch a standby channel of the first transmission channel to an active channel when the connection status of the first transmission channel reaches a second state, where the second state means that a congestion degree of a transmission channel reaches the second threshold.

Optionally, the first transmission channel, the second transmission channel, and the third transmission channel are transmission channels between the control device and a switching device in the SDN or transmission channels between the switching devices.

Optionally, the control device is further configured to implement setting or updating of a standby channel in a manner of delivering a flow table to a switching device, or implement switching between an active channel and a standby channel in a manner of delivering a flow table.

Optionally, the control device is further configured to send a probe data packet to the first transmission channel, the second transmission channel, and the third transmission channel, and acquire the connection status of each transmission channel according to a transmission time of the probe data packet on each transmission channel.

Optionally, the control device is further configured to acquire a transmission time of the probe data packet on each transmission channel, and determine whether the transmission time on the transmission channel reaches the first threshold and does not reach the second threshold, and determine that the connection status of the transmission channel reaches the first state if the transmission time on the transmission channel reaches the first threshold and does not reach the second threshold, or determine that the connection status of the transmission channel reaches the second state if the transmission time on the transmission channel reaches the second threshold.

Optionally, the control device is further configured to acquire a transmission channel switching notification message sent by the switching device in the SDN, where the switching notification message is a message of which the switching device notifies the control device after switching a standby channel to an active channel when the first transmission channel reaches the second state and the switching device does not receive a channel switching notification of the control device.

Optionally, the control device is further configured to according to the switching notification message sent by the switching device, enable a standby channel carried in the switching notification message, or deliver another transmission channel and use the other transmission channel as an active channel.

An embodiment of the present disclosure further provides a transmission channel adjustment method, applied to an SDN, where control information and data information in the SDN are transmitted on a same transmission channel, the SDN network includes a first transmission channel, a second transmission channel, and a third transmission channel, the first transmission channel is an active channel, the second transmission channel is a standby channel of the first transmission channel and is switched as an active channel when the first transmission channel does not meet a transmission condition, to transmit the control information and/or the data information, and the method includes acquiring, by a control device in the SDN, connection statuses of the first transmission channel, the second transmission channel, and the third transmission channel, setting the third transmission channel as a standby channel of the first transmission channel when the connection status of the second transmission channel reaches a first state, where the first state means that a congestion degree of a transmission channel reaches a first threshold but does not reach a second threshold, a transmission channel whose congestion degree reaches the first threshold is congested but can transmit the control information, a transmission channel that reaches the second threshold is congested and cannot transmit the control information, and the third transmission channel is a channel whose transmission channel does not reach the first state and that can replace the first transmission channel to transmit the control information and/or the data information, and switching a standby channel of the first transmission channel to an active channel when the connection status of the first transmission channel reaches a second state, where the second state means that a congestion degree of a transmission channel reaches the second threshold.

Optionally, the first transmission channel, the second transmission channel, and the third transmission channel are transmission channels between the control device and a switching device in the SDN or transmission channels between the switching devices.

Optionally, the control device implements setting or updating of a standby channel in a manner of delivering a flow table to a switch, or implements switching between an active channel and a standby channel in a manner of delivering a flow table.

Optionally, acquiring, by a control device in the SDN, connection statuses of the first transmission channel, the second transmission channel, and the third transmission channel includes sending, by the control device, a probe data packet to the first transmission channel, the second transmission channel, and the third transmission channel, and acquiring the connection status of each transmission channel according to transmission time of the probe data packet on each transmission channel.

Optionally, acquiring the connection status of each transmission channel according to transmission time of the probe data packet on each transmission channel includes acquiring a transmission time of the probe data packet on each transmission channel, and determining whether the transmission time on the transmission channel reaches the first threshold and does not reach the second threshold, and determining that the connection status of the transmission channel reaches the first state if the transmission time on the transmission channel reaches the first threshold and does not reach the second threshold, or determining that the connection status of the transmission channel reaches the second state if the transmission time on the transmission channel reaches the second threshold.

Optionally, the method further includes acquiring, by the control device, a switching notification message sent by the switching device, where the switching notification message is a message of which the switching device notifies the control device after switching a standby channel to an active channel when the first transmission channel reaches the second state and the switching device does not receive an active channel switching notification of the control device, and according to the switching notification message, enabling, by the control device, a standby channel carried in the switching notification message, or delivering another transmission channel and using the other transmission channel as an active channel. Optionally, the switching device in the SDN acquires the connection statuses of the first transmission channel, the second transmission channel, and the third transmission channel, and switches a standby channel to an active channel and sends the control device the switching notification message notifying channel switching when the first transmission channel reaches the second state and the switching device does not receive the channel switching notification of the control device.

An embodiment of the present disclosure further provides an SDN system, including a control device and a switching device, where control information and data information in the SDN are transmitted on a same transmission channel, the control device controls a first transmission channel, a second transmission channel, and a third transmission channel, the first transmission channel is an active channel between the control device and the switching device, the second transmission channel is a standby channel between the control device and the switching device and is switched as an active channel when the first transmission channel is congested, to transmit the control information and/or the data information, and the control device is configured to perform at least one of acquire connection statuses of the first transmission channel, the second transmission channel, and the third transmission channel, set the third transmission channel as a standby channel of the first transmission channel when the connection status of the second transmission channel reaches a first state, where the first state means that a congestion degree of a transmission channel reaches a first threshold but does not reach a second threshold, a transmission channel whose congestion degree reaches the first threshold is congested but can transmit the control information, a transmission channel that reaches the second threshold is congested and cannot transmit the control information, and the third transmission channel is a channel whose transmission channel does not reach the first state and that can replace the first transmission channel to transmit the control information and/or the data information, and switch a standby channel of the first transmission channel to an active channel when the connection status of the first transmission channel reaches a second state, where the second state means that a congestion degree of a transmission channel reaches the second threshold.

According to the control device, the system, and the transmission channel adjustment method in the SDN that are provided in the embodiments of the present disclosure, it is determined, using acquired connection statuses of control channels and according to a preset threshold, whether a standby channel is suitable to continue serving as a standby channel, the standby channel is adjusted, and another uncongested channel is set as a standby channel when the standby channel is congested to a specific extent, and the standby channel is switched to an active channel such that real-time channel adjustment is ensured, effective transmission of control information is ensured, and control reliability of a control device in SDN is improved when an active channel is congested.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
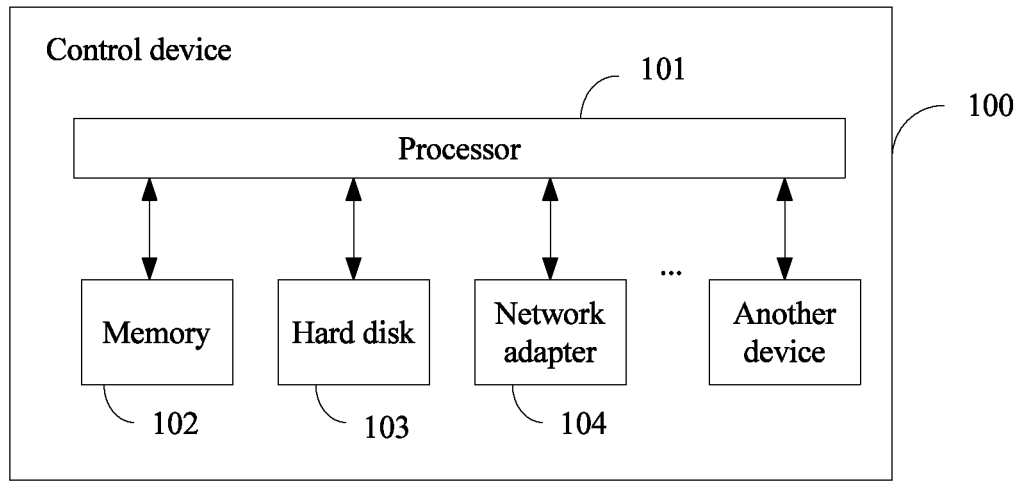
FIG. 1 is a schematic structural diagram of basic hardware of a control device in SDN.

Referring to FIG. 1, FIG. 1 is a schematic structural diagram of basic hardware of a control device 100 in SDN. The control device 100 includes basic hardware such as a processor 101, a memory 102, a hard disk 103, and a network adapter 104, and implements control using the processor 101 to read an instruction from the memory 102 or acquire related data and information from the hard disk 103 and the network adapter 104. The control device 100 further includes another device to implement other control and management functions of the control device, and details are not described herein.

Figure 2:
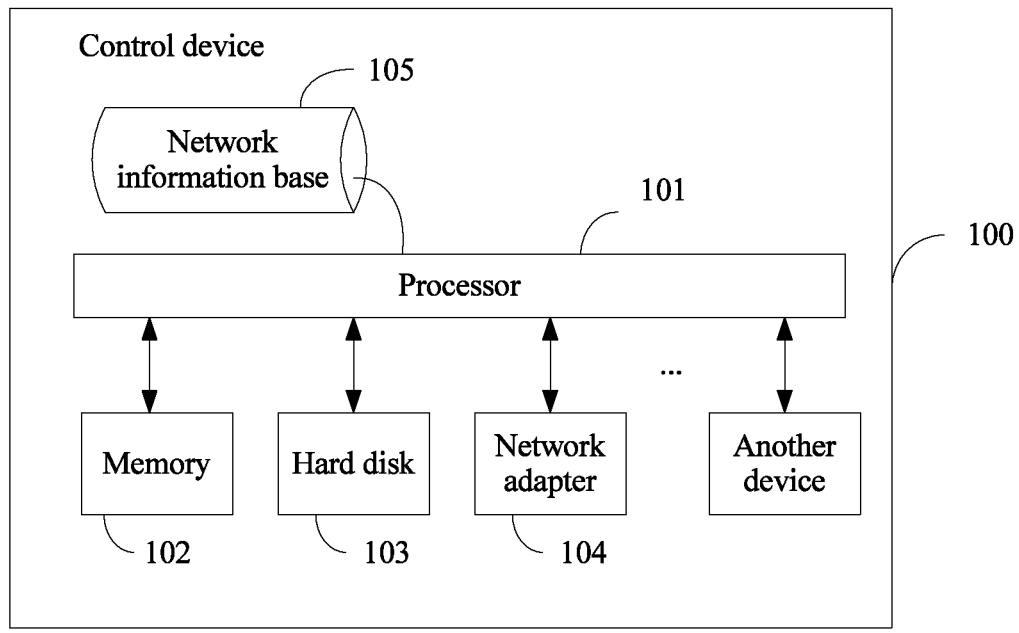
FIG. 2 is a schematic structural diagram of software and hardware of a network information base included in the control device.

In addition to necessary hardware, the control device 100 further includes necessary software that cooperates with the hardware to implement a control function. Referring to FIG. 2, FIG. 2 is a schematic structural diagram of software and hardware of a network information base included in the control device 100. The network information base 105 includes status information, node information, and the like of the SDN network in which the control device 100 is located. Information in the network information base 105 may be stored in a storage medium such as the hard disk 103 or the memory 102. The processor 101 may read the information in the network information base 105 using the memory 102 or the hard disk 103, to implement related control over the network.

Figure 3:
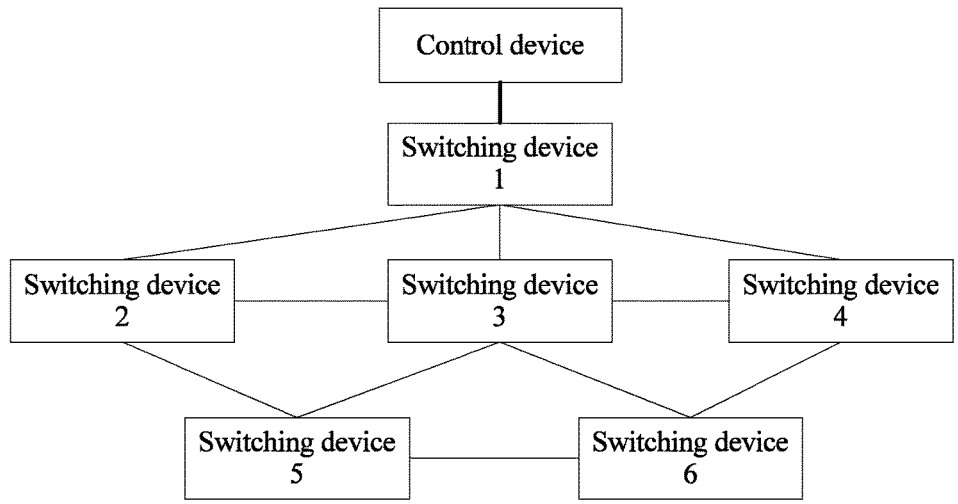
FIG. 3 is a schematic diagram of a network topology relationship in SDN.

There may be multiple control devices in the SDN, and there may be an active-standby relationship or a peer-to-peer relationship among the multiple control devices. One control device may control multiple switching devices, and one switching device may be controlled by multiple control devices. Generally, the control device is an independent server such as an X86 server. In this embodiment of the present disclosure, an example in which there is only one control device and six switching devices in the SDN network is used for description. As shown in FIG. 3, the control device is directly connected to a switching device 1, the switching device 1 is directly connected to each of a switching device 2, a switching device 3, and a switching device 4, a switching device 5 is directly connected to the switching device 2, the switching device 3, and a switching device 6, the switching device 6 is directly connected to the switching device 3, the switching device 4, and the switching device 5, any two switching devices may be connected using a different connection link, and each switching device may be connected to the control device using a different connection link, and receive control information delivered by the control device.

Control over the network by the control device in the SDN is generally implemented by means of pre-planning of a network control channel and a dynamic adjustment mechanism of the control channel. For example, in an in-band mode, the control device has established initial control channels of switching devices in the entire network. The initial control channels are control channels between the control device and the switching devices and between the switching devices, and the initial control channels are unobstructed such that control information of the control device can be successfully delivered to the switching device, and therefore, effective control over the SDN by the control device is implemented. In a running process of the SDN network, because the control information and data information are transmitted on one transmission channel, forwarding of the data information may cause congestion of the transmission channel, and further affect effective transmission of the control information. An existing dynamic adjustment mechanism is implemented in a manner of configuring a standby channel in advance or computing a new transmission channel when a fault occurs in the network. In this dynamic adjustment mechanism, real-time performance is poor, and switching to a normal transmission channel cannot be performed in an effective and timely manner to implement transmission of the control information.

For example, in FIG. 3, data forwarding and data flow control are performed between the control device and all the switching devices in the in-band mode. It is assumed that an active channel between the control device and the switching device 5 is, the control device→the switching device 2→the switching device 5, and a standby channel of the active channel is, the control device→the switching device 2→the switching device 3→the switching device 5. When a transmission channel between the switching device 2 and the switching device 3 is congested, for example, a congestion degree is 75%, and the transmission channel is possibly to be completely congested, in this case, the standby channel (the control device→the switching device 2→the switching device 3→the switching device 5) is not adjusted according to a solution in the other approaches. The unadjusted standby channel may also be congested and cannot be used to transmit the control information when the channel between the control device and the switching device 5 needs to be switched because of congestion.

The embodiments of the present disclosure provide a control device, an SDN system, and a transmission channel adjustment method in SDN, to resolve a problem that, in the SDN network, effective transmission of control information is affected because in an in-band mode, real-time performance of a control channel adjustment mechanism is poor, a standby channel is not updated in a timely manner, and the standby channel is also congested when a transmission channel is congested and switching to the standby channel is to be performed.

Figure 4:
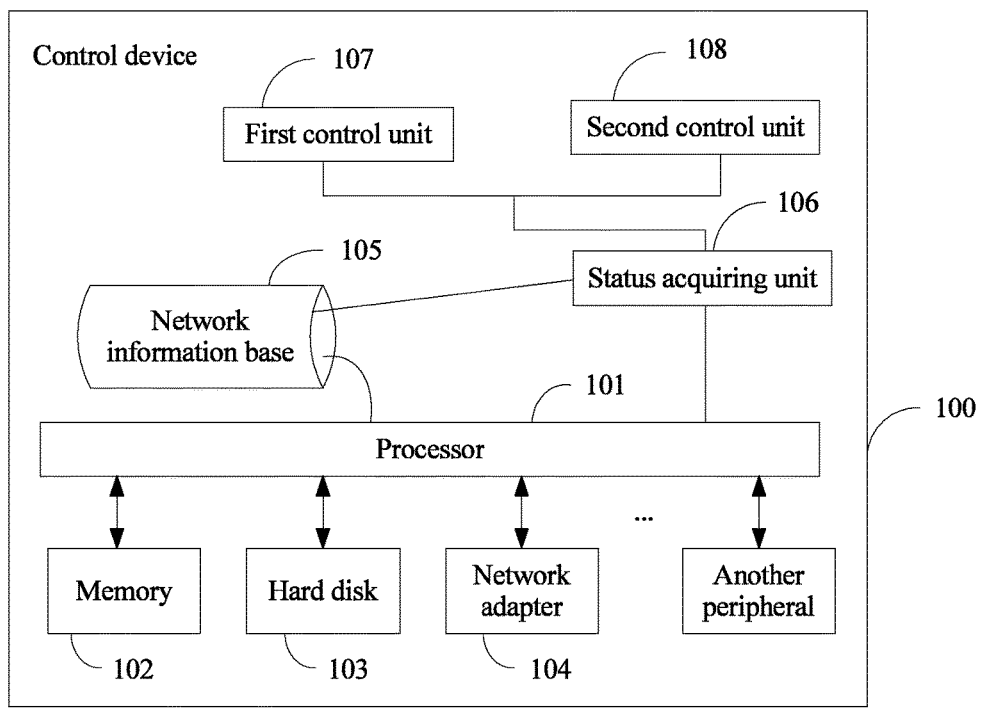
FIG. 4 is a structure implementation diagram of a control device according to an embodiment of the present disclosure.

As shown in FIG. 4, based on an existing control device, a status acquiring unit, a first control unit, and a second control unit are added to the control device, in the SDN, provided in this embodiment of the present disclosure. A standby channel is adjusted in real time to implement that when an active channel is congested, a switched transmission channel can effectively transmit control information. The control device 100 in FIG. 2 is used as an example, and based on the control device 100, a status acquiring unit 106, a first control unit 107, and a second control unit 108 are added to the control device provided in this embodiment of the present disclosure. The status acquiring unit 106, the first control unit 107, and the second control unit 108 may exist in a module or a unit of the existing control device 100, or may be disposed independently. The first control unit 107 and the second control unit 108 may be combined into one independent control unit, or may be disposed independently. In this embodiment of the present disclosure, an example in which the status acquiring unit 106, the first control unit 107, and the second control unit 108 are disposed independently is used for description.

The status acquiring unit 106 is configured to acquire connection statuses of a first transmission channel, a second transmission channel, and a third transmission channel.

The first control unit 107 is configured to set the third transmission channel as a standby channel of the first transmission channel when the connection status of the second transmission channel reaches a first state, where the first state means that a congestion degree of a transmission channel reaches a first threshold but does not reach a second threshold, a transmission channel whose congestion degree reaches the first threshold is congested but can transmit control information, a transmission channel that reaches the second threshold is congested and cannot transmit the control information, and the third transmission channel is a channel whose transmission channel does not reach the first state and that can replace the first transmission channel to transmit the control information and/or data information.

The second control unit 108 is configured to switch a standby channel of the first transmission channel to an active channel when the connection status of the first transmission channel reaches a second state, where the second state means that a congestion degree of a transmission channel reaches the second threshold.

An SDN network architecture shown in FIG. 3 is used as an example. The first transmission channel may include the control device→the switching device 2→the switching device 5, the second transmission channel may include the control device→the switching device 2→the switching device 3→the switching device 5, and the third transmission channel may include the control device→the switching device 3→the switching device 5. The status acquiring unit 106 may acquire information about the first transmission channel and the second transmission channel from the network information base 105, and acquire real-time statuses of the first transmission channel, the second transmission channel, and the third transmission channel using the processor 101 and the like. The first control unit 107 determines, according to the real-time statuses that are of the three transmission channels and acquired by the status acquiring unit 106, whether the second transmission channel is congested and a congestion degree, when the second transmission channel is partially congested and is possibly to be congested and cannot transmit the control information, for example, when the congestion degree reaches a preset partial congestion threshold and does not reach a complete congestion threshold, sets the third transmission channel has not been partially congested as a standby channel of the first transmission channel, or uses the third transmission channel as a standby channel that is of the first transmission channel and whose priority is higher than that of the second transmission channel. If congestion also occurs between the control device and the switching device 2 or between the switching device 2 and the switching device 5 in this case, for example, when a congestion degree reaches the complete congestion threshold, and the control information cannot be transmitted, the second control unit 108 switches the standby channel, that is, the third transmission channel, to an active channel. In this way, a previously set standby channel that is to be congested or is already congested is not switched to an active channel such that real-time channel adjustment is ensured, effective transmission of control information is ensured, and control reliability of a control device in SDN is improved.

During specific implementation, the OPENFLOW protocol is generally used between the control device and the switching device in the SDN, and the control device implements setting of the switching device and a control channel in a manner of delivering a flow table. The flow table generally includes three parts a header field, a counter, and an action, where the header field is used to match a data packet, the counter is used to count a quantity of data packets, and the action is used to describe how to process a matched data packet, that is, how the switching device should process the matched data packet after receiving the matched data packet.

Figure 5:
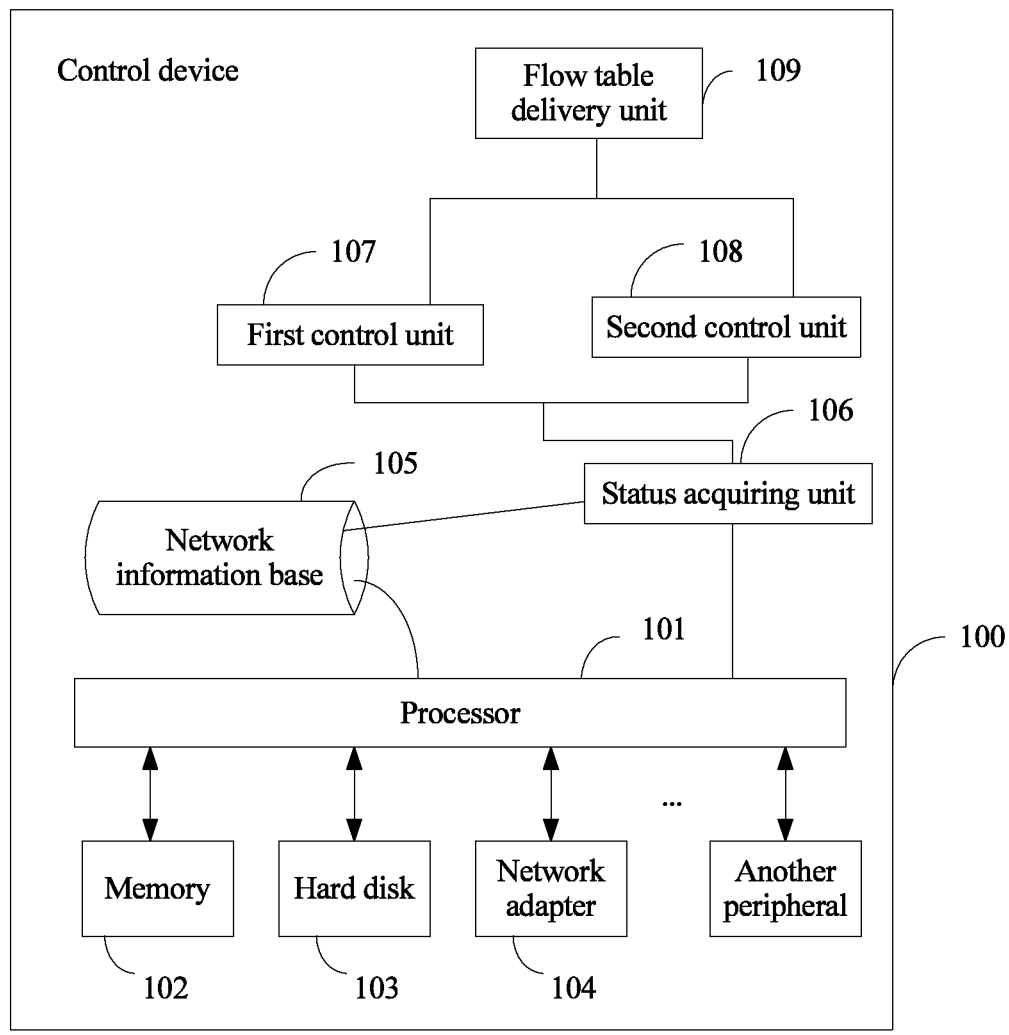
FIG. 5 is a structure implementation diagram of another control device according to an embodiment of the present disclosure.

As shown in FIG. 5, the control device 100 provided in this embodiment of the present disclosure may further include a flow table delivery unit 109. The flow table delivery unit 109 implements setting or updating of a standby channel in a manner of delivering a flow table to a switching device, or implements switching between an active channel and a standby channel in a manner of delivering a flow table. For example, in FIG. 3, the control device delivers a flow table to the switching device 5, where information about a standby channel is recorded in an action part in the flow table, and when an active channel is congested, the flow table delivery unit 109 delivers a new flow table and records, in an action part, operation information for switching a standby channel to an active channel.

Figure 6:
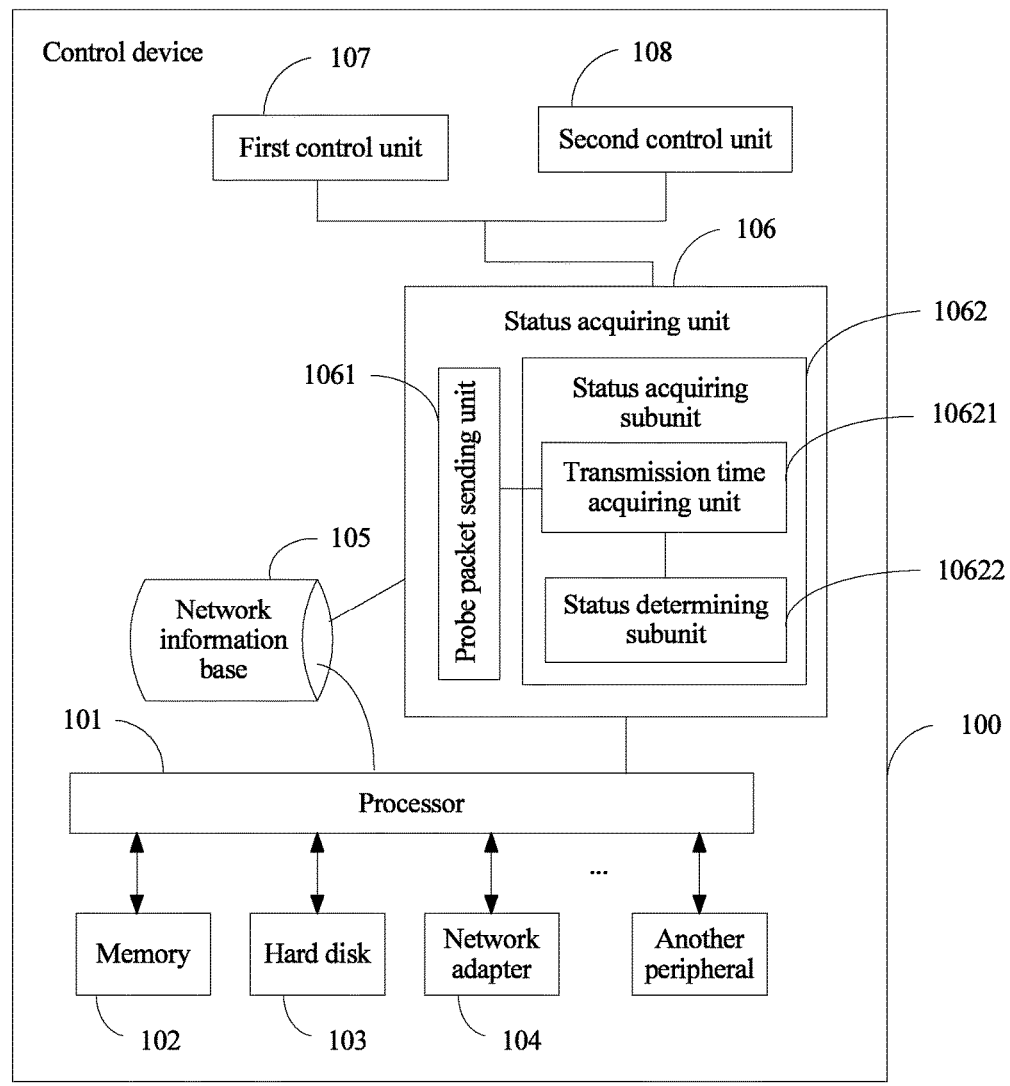
FIG. 6 is a structure implementation diagram of specific implementation of another control device according to an embodiment of the present disclosure.

During specific implementation, as shown in FIG. 6, the status acquiring unit 106 in this embodiment of the present disclosure may include a probe packet sending unit 1061 and a status acquiring subunit 1062.

The probe packet sending unit 1061 is configured to send a probe data packet to the first transmission channel, the second transmission channel, and the third transmission channel.

Further, different transmission channels may be identified using different identifiers (IDs), to distinguish between the different transmission channels. A frequency of sending the probe packet by the probe packet sending unit 1061 may be set according to a network status. For example, the frequency of sending the probe packet is increased when network load is heavy, or the frequency of sending the probe packet may be decreased when network load is light.

The probe data packet may include a probe packet at a link level, a probe packet at a path level, and the like. The probe data packet at the link level is a probe data packet sent from a startpoint device of a link to an endpoint device of the link and then sent back to the startpoint device. In this way, a transmission time is detected in both directions of the link. The startpoint device may be the control device or a switching device in the SDN, and the endpoint device may be a switching device in the SDN.

The probe data packet at the path level is a probe data packet that carries a specified hop count and that is sent by the control device according to all nodes (the switching device and switching devices) on a transmission channel. Different lengths are set for the probe data packet according to lengths of paths. For example, there are totally three nodes in the path, that is, the control device→the switching device 2→the switching device 5, in FIG. 3. A probe data packet sent from the control device to the switching device 2, a probe data packet sent from the switching device 2 to the switching device 5, a probe data packet returned from the switching device 5 to the switching device 2, and a probe data packet sent from the switching device 2 to the control device need to be separately set such that probe packets between all nodes in the path are set.

The status acquiring subunit 1062 is configured to acquire the connection status of each transmission channel according to a transmission time of the probe data packet on each transmission channel.

A switching device that receives a probe data packet adds, according to an ID of the probe data packet, a timestamp to the probe data packet to record a time at which the probe data packet is received, and forwards the probe data packet to a next switching device. In this way, when the probe data packet is returned to the control device, timestamps added by all nodes on a transmission channel are recorded, and accordingly, the connection status of each transmission channel is acquired according to the timestamps. A difference between a timestamp added by a source switching device and a timestamp added by a destination switching device in each link is a transmission time of the link. If a transmission time on a transmission channel is long, for example, reaches a preset threshold, it indicates that congestion occurs in a connection status of the transmission channel, or if transmission time on a transmission channel is less than a preset threshold, it indicates that no congestion occurs.

Further, when a standby channel is congested and a congestion degree reaches the first threshold, it may be further determined whether the congestion degree of the transmission channel is on the rise from a time point to a next time point, and the third transmission channel whose congestion degree does not reach the first threshold is set as a standby channel if the congestion degree is on the rise, or the third transmission channel is used as a standby channel with a highest priority.

The probe packet sending unit 1061 sends the probe data packet, and the status acquiring subunit 1062 acquires the connection status of each transmission channel according to the transmission time of the probe data packet such that the control device can acquire a congestion status of each transmission channel in real time, to provide reference for selecting a standby channel and switching between an active channel and the standby channel, and provide effective support for adjusting the standby channel in a timely manner when the standby transmission channel is congested and is to be in a completely congested state. It should be noted that, in this embodiment of the present disclosure, a connection status of a transmission channel is determined according to a transmission time of a probe data packet on the transmission channel. In a specific implementation process, alternatively, another manner may be used to acquire a connection status of a transmission channel. A manner may be used to achieve an objective of effectively transmitting control information by the control device in the present disclosure, provided that the manner can be used to determine whether a transmission channel is congested or is to be congested. The present disclosure imposes no limitation on a specific manner of acquiring a transmission channel status.

In an optional implementation manner, the status acquiring subunit 1062 includes a transmission time acquiring unit 10621 configured to acquire a transmission time of the probe data packet on each transmission channel, and a status determining subunit 10622 configured to determine whether the transmission time on the transmission channel reaches the first threshold and does not reach the second threshold, and determine that the connection status of the transmission channel reaches the first state if the transmission time on the transmission channel reaches the first threshold and does not reach the second threshold, or determine that the connection status of the transmission channel reaches the second state if the transmission time on the transmission channel reaches the second threshold.

Figure 7:
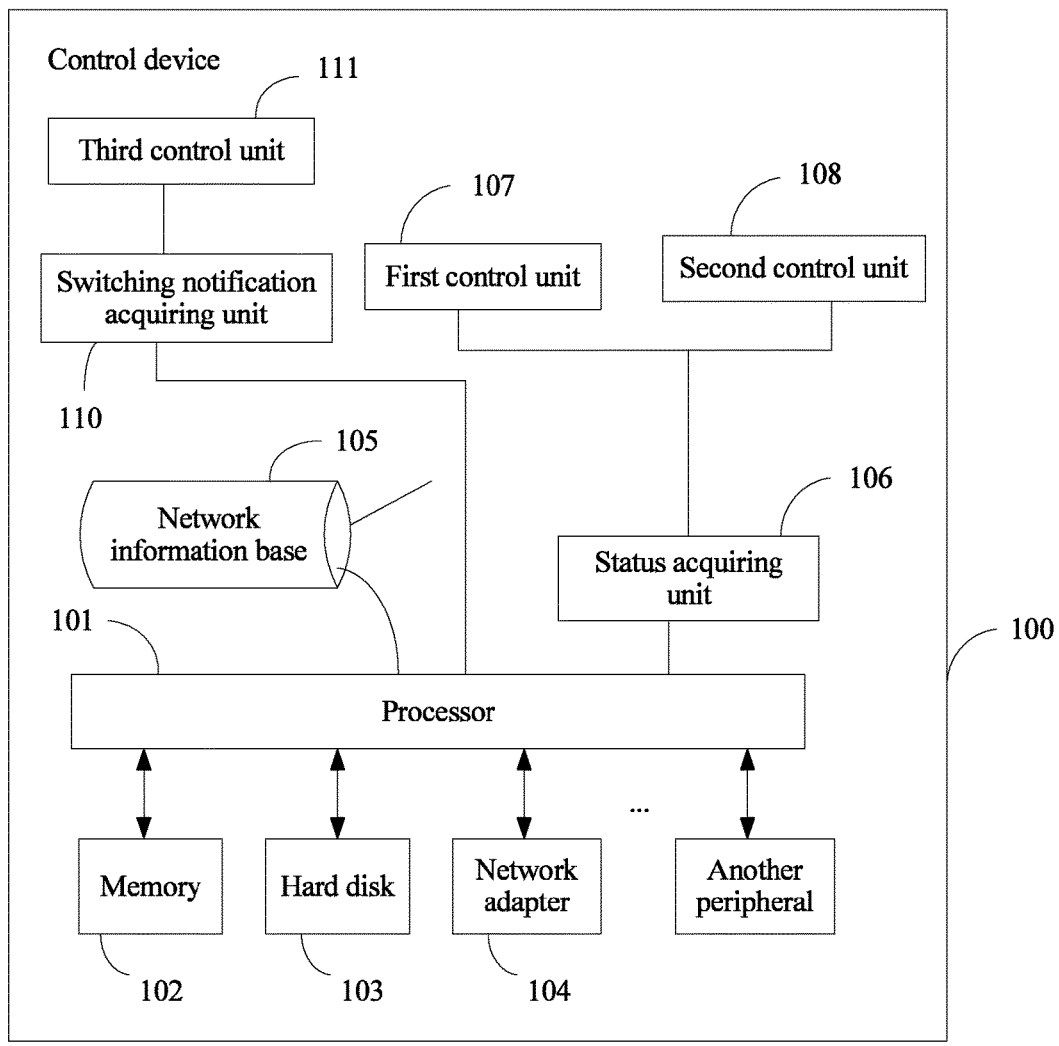
FIG. 7 is a structure implementation diagram of another control device according to an embodiment of the present disclosure.

In a running process of the SDN, it may also occur that some links in the network or a port of a switching device is already congested, and a related switching device does not receive a new flow table delivered by the control device, to enable transmission channel switching. In this case, the control device has lost a capability of controlling some switching devices. To ensure effective control by the control device, the related switching device may actively switch a control channel and report information about the switching to the control device. Correspondingly, as shown in FIG. 7, the control device 100 in this embodiment of the present disclosure further includes a switching notification acquiring unit 110 configured to acquire a transmission channel switching notification message sent by the switching device in the SDN, where the switching notification message is a message of which the switching device notifies the control device 100 after switching a standby channel to an active channel when the first transmission channel reaches the second state and the switching device does not receive a channel switching notification of the control device 100.

The SDN network in FIG. 3 is used as an example. If congestion occurs between the switching device 2 and the switching device 5, the switching device 5 cannot receive the control information of the control device using the active channel, and the switching device 5 does not receive a channel switching notification of the control device, either, in this case, the switching device 5 may switch, to an active channel, a previously received standby channel (such as the control device→the switching device 3→the switching device 5) delivered by the control device 100, and send information about the switched channel to the control device 100. After receiving a notification from the switching device 5, the switching notification acquiring unit 110 in the control device 100 determines whether the channel (the control device→the switching device 3→the switching device 5) can be used as a transmission channel to the switching device 5 to transmit the control information, and accepts the switching and keeps a related record, for example, keeps a record in the network information base 105 if the channel is suitable to serve as a new active channel, or if the switching notification acquiring unit 110 determines that the channel (the control device→the switching device 3→the switching device 5) is not suitable to serve as a transmission channel to the switching device 5 to transmit the control information, for example, the channel is also congested or has a relatively long delay, acquires a new transmission channel to the switching device 5 and delivers the new transmission channel to the switching device 5.

Correspondingly, the control device 100 in this embodiment of the present disclosure may further include a third control unit 111 configured to enable a standby channel carried in the switching notification message according to the switching notification message sent by the switching device, or deliver another transmission channel and set the other transmission channel as an active channel.

A switching notification acquiring unit 110 acquires a transmission channel switching notification message sent by a switching device in SDN, and a third control unit 111 enables a standby channel carried in the switching notification message according to the switching notification message sent by the switching device, or delivers another transmission channel and set the other transmission channel as an active channel such that transmission channel switching can be implemented if a transmission channel fails and channel switching cannot be implemented, which further ensures timely adjustment of a channel for transmitting control information, and improves control reliability of a control device 100.

Figure 8:
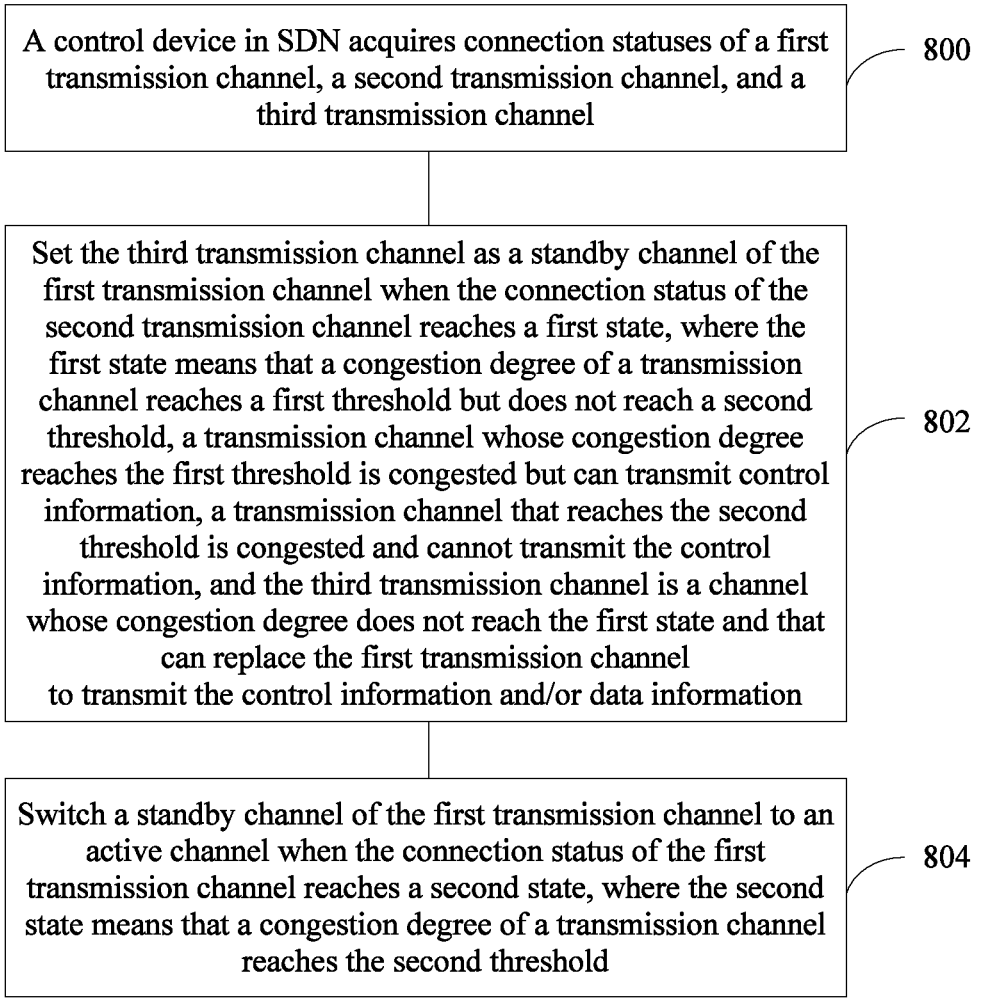
FIG. 8 is a schematic flowchart of a channel adjustment method according to an embodiment of the present disclosure.

Referring to FIG. 8, FIG. 8 is a schematic flowchart of a transmission channel adjustment method according to an embodiment of the present disclosure. The method is applied to an SDN, where control information and data information in the SDN are transmitted on a same transmission channel, the SDN network includes a first transmission channel, a second transmission channel, and a third transmission channel, the first transmission channel is an active channel, the second transmission channel is a standby channel of the first transmission channel and is switched as an active channel when the first transmission channel does not meet a transmission condition, to transmit the control information and/or the data information, and the method includes the following steps.

Step 800: A control device in the SDN acquires connection statuses of the first transmission channel, the second transmission channel, and the third transmission channel.

Step 802: Set the third transmission channel as a standby channel of the first transmission channel when the connection status of the second transmission channel reaches a first state, where the first state means that a congestion degree of a transmission channel reaches a first threshold but does not reach a second threshold, a transmission channel whose congestion degree reaches the first threshold is congested but can transmit the control information, a transmission channel that reaches the second threshold is congested and cannot transmit the control information, and the third transmission channel is a channel whose congestion degree does not reach the first state and that can replace the first transmission channel to transmit the control information and/or the data information.

Step 804: Switch a standby channel of the first transmission channel to an active channel when the connection status of the first transmission channel reaches a second state, where the second state means that a congestion degree of a transmission channel reaches the second threshold.

In the foregoing method, a status of a transmission channel is acquired. It is determined, according to the status of the transmission channel and according to a preset threshold, whether a standby channel is suitable to continue serving as a standby channel, the standby channel is adjusted when the standby channel is congested to a specific extent, and another uncongested channel is set as a standby channel, and when an active channel is congested, the standby channel is switched to an active channel such that real-time channel adjustment is ensured, effective transmission of control information is ensured, and control reliability of a control device in SDN is improved.

The first transmission channel, the second transmission channel, and the third transmission channel are transmission channels between the control device and a switching device in the SDN or transmission channels between the switching devices.

In this embodiment of the present disclosure, the control device implements setting or updating of a standby channel in a manner of delivering a flow table to a switch, or implements switching between an active channel and a standby channel in a manner of delivering a flow table.

In an optional implementation manner, that a control device in the SDN acquires connection statuses of the first transmission channel, the second transmission channel, and the third transmission channel in the foregoing method embodiment may include sending, by the control device, a probe data packet to the first transmission channel, the second transmission channel, and the third transmission channel, and acquiring the connection status of each transmission channel according to transmission time of the probe data packet on each transmission channel.

Acquiring the connection status of each transmission channel according to transmission time of the probe data packet on each transmission channel may include acquiring a transmission time of the probe data packet on each transmission channel, and determining whether the transmission time on the transmission channel reaches the first threshold and does not reach the second threshold, and determining that the connection status of the transmission channel reaches the first state if the transmission time on the transmission channel reaches the first threshold and does not reach the second threshold, or determining that the connection status of the transmission channel reaches the second state if the transmission time on the transmission channel reaches the second threshold.

For the method for implementing transmission channel control by the control device in the foregoing method embodiment, reference may be further made to a specific implementation manner of the control device 100 in the foregoing embodiment, and details are not described.

Figure 9:
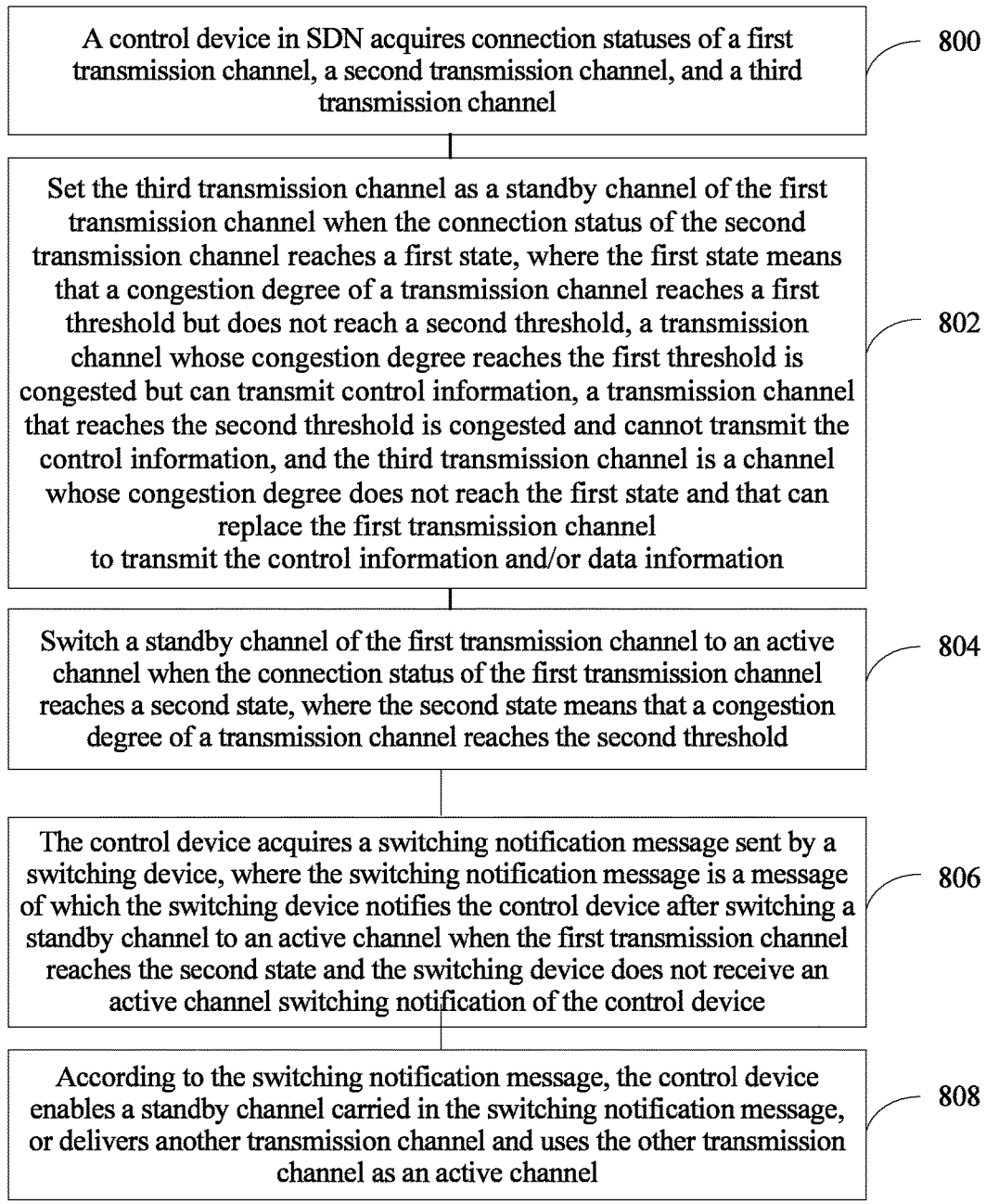
FIG. 9 is a schematic flowchart of another channel adjustment method according to an embodiment of the present disclosure.

When an active channel is congested, and a control device cannot acquire related information about the congestion in a timely manner, when not receiving a switching notification message from the control device, a related switching device in SDN in which the control device is located, for example, a switching device on the active channel, enables switching of a standby channel according to a congestion status that is of the active channel and acquired by means of probing in advance, and sends a channel switching notification message to the control device. Correspondingly, as shown in FIG. 9, the transmission channel adjustment method in this embodiment of the present disclosure further includes the following steps.

Step 806: The control device acquires a switching notification message sent by a switching device, where the switching notification message is a message of which the switching device notifies the control device after switching a standby channel to an active channel when the first transmission channel reaches the second state and the switching device does not receive an active channel switching notification of the control device.

Step 808: According to the switching notification message, the control device enables a standby channel carried in the switching notification message, or delivers another transmission channel and uses the other transmission channel as an active channel.

For the method for implementing transmission channel control by the control device in the foregoing method embodiment, reference may be further made to a specific implementation manner of the control device 100 in the foregoing embodiment, and details are not described.

A transmission channel switching notification message sent by a switching device is acquired, and according to the switching notification message, a standby channel carried in the switching notification message is enabled, or another transmission channel is delivered and used as an active channel such that if a transmission channel fails and channel switching cannot be implemented, transmission channel switching can be implemented, which further ensures timely adjustment of a channel for transmitting control information, and improves control reliability of a control device.

The following uses an SDN architecture shown in FIG. 3 as an example to describe the transmission channel adjustment method and an implementation manner of the control device in this embodiment of the present disclosure.

A networking mode of the network shown in FIG. 3 is an in-band control mode. A control device sets probe data packets of all established channels on an initial control channel according to the control channel. In this embodiment, an example in which probe data packets of three transmission channels are formulated is used for description. Formats of the probe data packets formulated by the control device are shown in Table 1 to Table 3, and it is assumed that the data packets are data packets for the 001$^{st}$ probe.

TABLE 1

| Probe data packet in a control channel path (a switching device 1 → a switching device 2 → a switching device 5) | | | | | | |
|---|---|---|---|---|---|---|
| Sw_ID | T1/T5 | Sw_ID | T2/T4 | Sw_ID | T3 | Probe ID |
| S1 | */* | S2 | */* | S5 | *** | 001 |

TABLE 2

| Probe data packet in a control channel path (a switching device 1 → a switching device 3 → a switching device 5) | | | | | | |
|---|---|---|---|---|---|---|
| Sw_ID | T1/T5 | Sw_ID | T2/T4 | Sw_ID | T3 | Probe ID |
| S1 | */* | S3 | */* | S5 | *** | 001 |

TABLE 3

| Probe data packet in a control channel path (a switching device 1 → a switching device 2 → a switching device 3) | | | | | | |
|---|---|---|---|---|---|---|
| Sw_ID | T1/T5 | Sw_ID | T2/T4 | Sw_ID | T3 | Probe ID |
| S1 | */* | S2 | */* | S3 | *** | 001 |

A switch adds a timestamp to each probe data packet at an idle time location, and forwards the probe data packet to a next-hop switch. For example, for a probe data packet in a control channel path (a switching device 1→a switching device 2→a switching device 5), the data packet is first sent by the control device to the switching device 1, and the switching device 1 adds a timestamp t01 at an idle location T1, and then forwards the probe data packet to the next-hop switching device 2 according to a next-hop switching device ID in the probe data packet. The switching device 2 adds a timestamp t02 at a location T2, and likewise, forwards the probe data packet to the next-hop switching device 5 according to the foregoing rule. After receiving the probe data packet, the switching device 5 adds a timestamp t03 at an idle time location T3, and forwards the probe data packet to the switching device 2. The switching device 2 receives the probe data packet sent by the switching device 5, adds a timestamp t04 at a location T4, and then forwards the probe data packet to the switching device 1, and the switching device 1 adds a timestamp t05 at a location T5. After the timestamps are added on the control channel, the probe data packet in the control channel path, that is, the switching device 1→the switching device 2→the switching device 5, is as follows.

TABLE 1

| Probe data packet in a control channel path (a switching device 1 → a switching device 2 → a switching device 5) | | | | | | |
|---|---|---|---|---|---|---|
| Sw_ID | T1/T5 | Sw_ID | T2/T4 | Sw_ID | T3 | Probe ID |
| S1 | t01/t05 | S2 | t02/t04 | S5 | t03 | 001 |

The control device maintains a status of each link on a control channel after receiving a probe data packet fed back by a switching device. It is assumed that a connection status of a link from the switching device 5 to the switching device 2 is as follows.

A probe time of L52 is obtained from the probe data packet in the switching device 1→the switching device 2→the switching device 5 using a difference between T4 and T3. A physical delay of L52 is 100 milliseconds (ms), and the control device sends the probe data packet every 10 ms. The status is as follows.

TABLE 4

Status table of a link L52 on a control channel

| Link ID | probe time | Physical time T | Transmission time ΔT | probe ID | Receiving time |
|---------|-----------|-----------------|----------------------|----------|----------------|
| L52 (S5 → S2) | 100 ms | 100 ms | 0 ms | 001 | t001 |
| | 110 ms | 100 ms | 10 ms | 002 | t002 |
| | 130 ms | 100 ms | 30 ms | 003 | t003 |
| | 150 ms | 100 ms | 50 ms | 004 | t004 |
| | ... | | ... | ... | ... |

For L52, if the preset first threshold is 10 ms, and the preset second threshold is 50 ms, according to the real-time status in the foregoing table, when a probe data packet whose probe ID is 003 is received, a transmission delay of L52 is 30 ms and reaches a warning value 10 ms, and the transmission delay is in a rising state (a transmission delay for the probe ID 002 is 10 ms). In this case, the control device removes L52 from a topology, enables rerouting, and computes a new routing channel from OFS_5 to the control device.

If a result of the rerouting is the switching device 1→a switching device 3→the switching device 5 in this case, the control device delivers a backup flow table to the switching device 5 and uses the backup flow table as a first-priority backup flow table. The delivered flow table is shown in Table 5. In Table 5, a flow table in the second row with a bold black solid line is the first-priority backup flow table delivered by the control device. The other flow table is a control channel forwarding flow table entry of the switching device 5.

TABLE 5

Flow table entry of a switching device 5

| in_port | src_ip | src_mac | dst_ip | dst_mac | src_tp | dst_tp | priority | action |
|---------|--------|---------|--------|---------|--------|--------|----------|--------|
| — | — | — | 192.168.1.100 | OFC | — | 6633 | 100 | Out-to-port 52 |
| — | — | — | 192.168.1.100 | OFC | — | 6633 | 90 | Out-to-port 53 |

When receiving a probe data packet whose probe ID is 004, the control device finds that the transmission delay of the link L52 is 50 ms and has reached the second threshold. In this case, the control device instructs the switching device 5 to enable the first-priority backup flow table entry. In this case, in the SDN, a control channel from the switching device 5 to the control device is adjusted from the switching device 1→the switching device 2→the switching device 5 to the switching device 1→the switching device 3→the switching device 5.

When congestion has occurred between the switching device 2 and the control device, and the switching device 2 does not receive a control channel update policy delivered by the control device, the switching device 2 may detect connection statuses of links, that is, the switching device 2→the switching device 5, the switching device 2→the switching device 3, and the switching device 2→the switching device 1, in real time. The switching device 2 detects that a packet loss case or congestion occurs in the link, that is, the switching device 2→the switching device 1, and a congestion degree has reached the second threshold, and the switching device 2 does not receive a control channel switching message delivered by the control device. In this case, the switching device 2 queries a backup flow table of the switching device 2, and enables the flow table as a new forwarding flow table entry if there is a first-priority backup flow table, or randomly enables another backup flow table whose port is in a normal state if there is no first-priority backup flow table. As shown in Table 6, the first-priority backup flow table entry is a flow table entry in a black bold box in the second row.

TABLE 6

Flow table entry of a switching device 2

| in_port | src_ip | src_mac | dst_ip | dst_mac | src_tp | dst_tp | priority | action |
|---------|--------|---------|--------|---------|--------|--------|----------|--------|
| — | — | OFS_2 | 192.168.1.100 | OFC | — | 6633 | 100 | Out-to-port 21 |
| — | — | OFS_2 | 192.168.1.100 | OFC | — | 6633 | 90 | Out-to-port 23 |
| — | ... | OFS_2 | 192.168.1.100 | OFC | ... | 6633 | 80 | Out-to-port 25 |

In addition, the switching device 2 sends a control channel switching message to the control device, and the control channel switching message is as follows.

| OFS_Id | Src_Port | OFC | NewPort | Time |
|--------|----------|-----|---------|------|
| OFS_2 | P_21 | OFC | P_23 | t1 |

After receiving the switching notification message sent by the switching device 2, the control device enables a third control unit to determine that a new control channel path, that is, the switching device 2→the switching device 3→the switching device 1→the control device, is not congested and is suitable to serve as a new control channel. The control channel is accepted, and information about the new control channel is added to a network information base.

Figure 10:
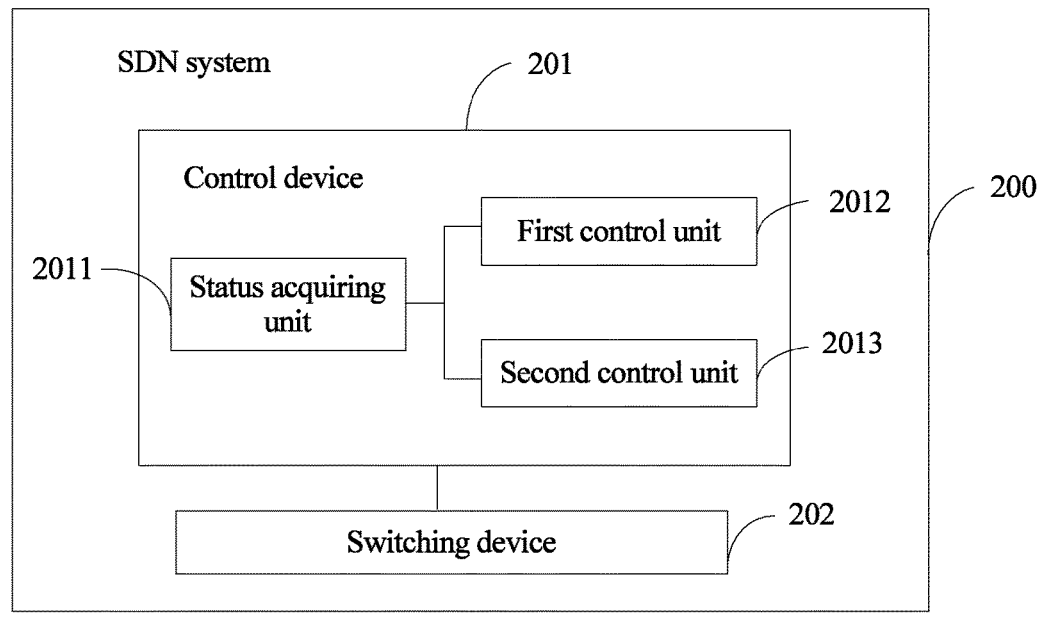
FIG. 10 is a schematic structural diagram of an SDN system according to an embodiment of the present disclosure.

As shown in FIG. 10, an embodiment of the present disclosure further provides an SDN system 200, including a control device 201 and a switching device 202, where control information and data information in the SDN system 200 are transmitted on a same transmission channel, the control device 201 controls a first transmission channel, a second transmission channel, and a third transmission channel, the first transmission channel is an active channel between the control device 201 and the switching device 202, the second transmission channel is a standby channel between the control device 201 and the switching device 202 and is switched as an active channel when the first transmission channel is congested, to transmit the control information and/or the data information, and the control device 201 includes a status acquiring unit 2011 configured to acquire connection statuses of the first transmission channel, the second transmission channel, and the third transmission channel, a first control unit 2012 configured to set the third transmission channel as a standby channel of the first transmission channel when the connection status of the second transmission channel reaches a first state, where the first state means that a congestion degree of a transmission channel reaches a first threshold but does not reach a second threshold, a transmission channel whose congestion degree reaches the first threshold is congested but can transmit the control information, a transmission channel that reaches the second threshold is congested and cannot transmit the control information, and the third transmission channel is a channel whose transmission channel does not reach the first state and that can replace the first transmission channel to transmit the control information and/or the data information, and a second control unit 2013 configured to switch a standby channel of the first transmission channel to an active channel when the connection status of the first transmission channel reaches a second state, where the second state means that a congestion degree of a transmission channel reaches the second threshold.

For a specific implementation manner of the foregoing SDN system 200, reference may be made to the foregoing implementation manner of the control device 100, and details are not described herein.

The SDN system 200 provided in this embodiment of the present disclosure determines, according to a preset threshold and using a first control unit 2012, a second control unit 2013, and connection statuses that are of control channels and acquired by a status acquiring unit 2011, whether a standby channel is suitable to continue serving as a standby channel, adjusts the standby channel and sets another uncongested channel as a standby channel when the standby channel is congested to a specific extent, and switches the standby channel to an active channel when an active channel is congested such that real-time channel adjustment is ensured, effective transmission of control information is ensured, and control reliability of a control device in SDN is improved.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in another manner. For example, the described apparatus embodiment is merely exemplary. For example, the unit division is merely logical function division and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of a software product. The software product is stored in a storage medium and includes several instructions for instructing a computer device (which may be a personal computer, a server, a network device, or the like) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any modification or replacement that is readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A control device in software-defined networking (SDN), control information and data information in the SDN being transmitted on a same transmission channel, the control device controlling a first transmission channel, a second transmission channel, and a third transmission channel, the first transmission channel being an active channel, the second transmission channel being a standby channel of the first transmission channel and being switched as the active channel when the first transmission channel is congested to transmit the control information or the data information, and the control device being configured to:

acquire connection statuses of the first transmission channel, the second transmission channel, and the third transmission channel;

set the third transmission channel as the standby channel of the first transmission channel when the connection status of the second transmission channel reaches a first state, the first state indicating that a congestion degree of a transmission channel reaches a first threshold but does not reach a second threshold, a transmission channel that congestion degree reaches the first threshold being congested but can transmit the control information, a transmission channel that reaches the second threshold being congested and cannot transmit the control information, and the third transmission channel being a channel that the connection status does not reach the first state and that can replace the first transmission channel to transmit the control information or the data information;

switch the standby channel of the first transmission channel to the active channel when the connection status of the first transmission channel reaches a second state, the second state indicating that the congestion degree of the transmission channel reaches the second threshold;

send a probe data packet to the first transmission channel, the second transmission channel, and the third transmission channel;

acquire the connection status of each transmission channel according to a transmission time of the probe data packet on each transmission channel;

acquire the transmission time of the probe data packet on each transmission channel;

determine whether the transmission time on the transmission channel reaches the first threshold and does not reach the second threshold;

determine that the connection status of the transmission channel reaches the first state when the transmission time on the transmission channel reaches the first threshold and does not reach the second threshold; and determine that the connection status of the transmission channel reaches the second state when the transmission time on the transmission channel reaches the second threshold.

2. The control device of claim 1, wherein the first transmission channel, the second transmission channel, and the third transmission channel are transmission channels between the control device and a switching device in the SDN.

3. The control device of claim 1, wherein the first transmission channel, the second transmission channel, and the third transmission channel are transmission channels between switching devices.

4. The control device of claim 2, further configured to implement setting of the standby channel in a manner of delivering a flow table to the switching device.

5. The control device of claim 2, further configured to implement updating of the standby channel in a manner of delivering a flow table to the switching device.

6. The control device of claim 2, further configured to implement switching between the active channel and the standby channel in a manner of delivering a flow table.

7. A control device in software-defined networking (SDN), control information and data information in the SDN being transmitted on a same transmission channel, the control device controlling a first transmission channel, a second transmission channel, and a third transmission channel, the first transmission channel being an active channel, the second transmission channel being a standby channel of the first transmission channel and being switched as the active channel when the first transmission channel is congested to transmit the control information or the data information, and the control device being configured to:

acquire connection statuses of the first transmission channel, the second transmission channel, and the third transmission channel;

set the third transmission channel as the standby channel of the first transmission channel when the connection status of the second transmission channel reaches a first state, the first state indicating that a congestion degree of a transmission channel reaches a first threshold but does not reach a second threshold, a transmission channel that congestion degree reaches the first threshold being congested but can transmit the control information, a transmission channel that reaches the second threshold being congested and cannot transmit the control information, and the third transmission channel being a channel that the connection status does not reach the first state and that can replace the first transmission channel to transmit the control information or the data information;

switch the standby channel of the first transmission channel to the active channel when the connection status of the first transmission channel reaches a second state, the second state indicating that the congestion degree of the transmission channel reaches the second threshold; and acquire a transmission channel switching notification message from a switching device in the SDN, the switching notification message being a message of which the switching device notifies the control device after switching the standby channel to the active channel when the first transmission channel reaches the second state and the switching device does not receive a channel switching notification of the control device.

8. The control device of claim 7, wherein according to the switching notification message from the switching device, the control device being further configured to enable a standby channel carried in the switching notification message.

9. The control device of claim 7, wherein according to the switching notification message from the switching device, the control device is further configured to:

deliver another transmission channel; and
set the other transmission channel as the active channel.

10. A transmission channel adjustment method, applied to a software-defined networking (SDN), control information and data information in the SDN being transmitted on a same transmission channel, the SDN comprising a first transmission channel, a second transmission channel, and a third transmission channel, the first transmission channel being an active channel, the second transmission channel being a standby channel of the first transmission channel and being switched as the active channel when the first transmission channel does not meet a transmission condition to transmit the control information or the data information, and the method comprising:

acquiring, by a control device in the SDN, connection statuses of the first transmission channel, the second transmission channel, and the third transmission channel by:
sending, by the control device, a probe data packet to the first transmission channel, the second transmission channel, and the third transmission channel; and
acquiring the connection status of each transmission channel according to transmission time of the probe data packet on each transmission channel by:
acquiring the transmission time of the probe data packet on each transmission channel;
determining whether the transmission time on the transmission channel reaches the first threshold and does not reach the second threshold;
determining that the connection status of the transmission channel reaches the first state when the transmission time on the transmission channel reaches the first threshold and does not reach the second threshold; and
determining that the connection status of the transmission channel reaches the second state when the transmission time on the transmission channel reaches the second threshold;
setting the third transmission channel as the standby channel of the first transmission channel when the connection status of the second transmission channel reaches a first state, the first state indicating that a congestion degree of a transmission channel reaches a first threshold but does not reach a second threshold, a transmission channel that congestion degree reaches the first threshold being congested but can transmit the control information, a transmission channel that reaches the second threshold being congested and cannot transmit the control information, and the third transmission channel being a channel that the connection status does not reach the first state and that can replace the first transmission channel to transmit the control information or the data information; and
switching the standby channel of the first transmission channel to the active channel when the connection status of the first transmission channel reaches a second state, the second state indicating that the congestion degree of the transmission channel reaches the second threshold.

11. The transmission channel adjustment method of claim 10, wherein the first transmission channel, the second transmission channel, and the third transmission channel are transmission channels between the control device and a switching device in the SDN.

12. The transmission channel adjustment method of claim 10, wherein the first transmission channel, the second transmission channel, and the third transmission channel are transmission channels between switching devices.

13. The transmission channel adjustment method of claim 11, wherein the control device implements:
setting or updating of the standby channel in a manner of delivering a flow table to the switching device; or
switching between the active channel and the standby channel in a manner of delivering the flow table.

14. A transmission channel adjustment method, applied to a software-defined networking (SDN), control information and data information in the SDN being transmitted on a same transmission channel, the SDN comprising a first transmission channel, a second transmission channel, and a third transmission channel, the first transmission channel being an active channel, the second transmission channel being a standby channel of the first transmission channel and being switched as the active channel when the first transmission channel does not meet a transmission condition to transmit the control information or the data information, and the method comprising:

acquiring, by a control device in the SDN, connection statuses of the first transmission channel, the second transmission channel, and the third transmission channel;
setting the third transmission channel as the standby channel of the first transmission channel when the connection status of the second transmission channel reaches a first state, the first state indicating that a congestion degree of a transmission channel reaches a first threshold but does not reach a second threshold, a transmission channel that congestion degree reaches the first threshold being congested but can transmit the control information, a transmission channel that reaches the second threshold being congested and cannot transmit the control information, and the third transmission channel being a channel that the connection status does not reach the first state and that can replace the first transmission channel to transmit the control information or the data information;
switching the standby channel of the first transmission channel to the active channel when the connection status of the first transmission channel reaches a second state, the second state indicating that the congestion degree of the transmission channel reaches the second threshold;
acquiring, by the control device, a switching notification message sent by a switching device, the switching notification message being a message of which the switching device notifies the control device after switching the standby channel to the active channel when the first transmission channel reaches the second state and the switching device does not receive an active channel switching notification of the control device; and
enabling, by the control device, a standby channel carried in the switching notification message, or delivering another transmission channel and setting the other transmission channel as an active channel according to the switching notification message.

15. The transmission channel adjustment method of claim 14, wherein acquiring, by the switching device in the SDN, the connection statuses of the first transmission channel, the second transmission channel, and the third transmission channel, and when the first transmission channel reaches the second state and the switching device does not receive the channel switching notification of the control device, the method further comprises:

switching the standby channel to the active channel; and
sending the control device the switching notification message notifying channel switching.

* * * * *